Oct. 7, 1924.
S. G. RUSSELL
SPRING WINDING FISHING REEL
Filed March 30, 1923
1,510,904
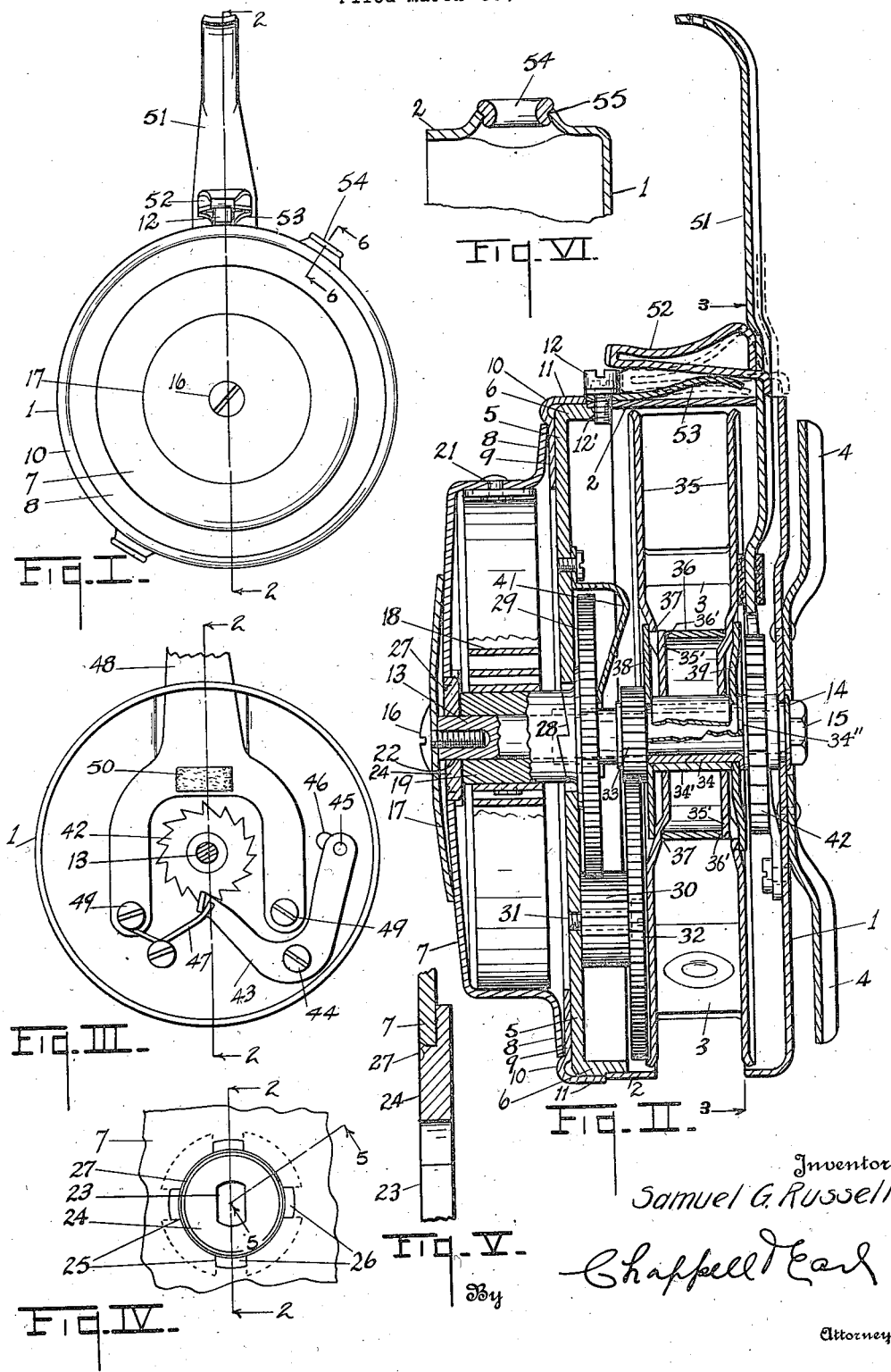
Inventor
Samuel G. Russell
By Chappell Earl
Attorneys Patented Oct. 7, 1924.

1,510,904

UNITED STATES PATENT OFFICE.

SAMUEL G. RUSSELL, OF KALAMAZOO, MICHIGAN, ASSIGNOR TO SHAKESPEARE COMPANY, OF KALAMAZOO, MICHIGAN.

SPRING-WINDING FISHING REEL.

Application filed March 30, 1923. Serial No. 628,687.

*To all whom it may concern:*

Be it known that I, SAMUEL G. RUSSELL, a citizen of the United States, residing at the city and county of Kalamazoo, State of Michigan, have invented certain new and useful Improvements in Spring-Winding Fishing Reels, of which the following is a specification.

This invention relates to improvements in spring winding fishing reels.

The main objects of this invention are:

First, to provide an improved spring winding fishing reel which is light in weight and very compact and at the same time one in which the parts are so arranged and supported that the reel is very durable.

Second, to provide an improved automatic reel having these advantages which is attractive in appearance and convenient to manipulate.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this application, in which:

Fig. I is a plan view of my improved fishing reel.

Fig. II is a central section on a line corresponding to line 2—2 of Figs. I, III and IV, the parts being shown in full lines for convenience in illustration.

Fig. III is a detail section on a line corresponding to line 3—3 of Fig. II showing the arrangement of the brake lever and the reel detent.

Fig. IV is a fragmentary plan view of the spring case showing details of the reinforcing multiple key bushing thereof.

Fig. V is a detail section on a line corresponding to line 5—5 of Fig. IV.

Fig. VI is an enlarged detail section through the line guide eye on a line corresponding to line 6—6 of Fig. I.

In the drawing similar reference characters refer to similar parts throughout the several views, and the sectional views are taken looking in the direction of the little arrows at the ends of the section lines.

Referring to the drawing, I provide a casing or housing member 1 in the form of a cylindrical cup, the periphery of this cup being partially cut away thereby providing a top portion 2 connected to the base portion by the cross pieces 3. The reel seat 4 is secured to this base member 1 of the casing. The gear plate 5 is provided with a peripheral flange 6 fitting within the base member 1 of the casing.

The spring case 7 is also cup-like in form, having an outwardly projecting peripheral flange 8 rotatable upon the bearing ring 9. The gear plate 5 and spring case 7 are preferably in practice formed of aluminum on account of lightness and, to provide a durable bearing between these soft metals, I provide the bearing ring 9, the same being a stamping of harder metal than the spring case 7 and gear plate 5 (preferably nickel silver) and having a bead 10 at its outer edge which acts as a peripheral bearing for the spring case 7 and which then extends into the flange 11 embracing the flange of the gear plate. This provides a finish and also a suitable bearing for the spring casing.

The gear plate 5 is supported against rotation by the screw 12 which engages a slot 12' in the flange of the gear plate.

The reel staff or the shaft 13 constitutes a tie member for the casing parts, it having a bearing member 14 at its lower end, the bearing member overlapping the casing, the staff being revolvably retained by the nut 15. The screw 16 tapped into the upper end of the staff engages the tension disc 17 bearing upon the spring case, thereby retaining the various parts in assembled relation.

The inner end of the driving spring 18 is connected to the ratchet member 19 mounted on the shaft, the outer end of the spring being connected to the spring casing at 21 so that the casing constitutes a hand piece for winding the spring.

The disc 17 is dished or concavo-convex, engaging and supporting the spring casing and holding its flange yieldingly against the bearing ring 9.

The staff has a non-circular portion 22 which is engaged with a non-circular hole 23 of the spring case bushing 24, this bushing being of thicker material than the spring case. The bushing 24 is peripherally shouldered to receive the spring case which is notched at 25 to receive the multiple lugs 26 formed up from the flange or reduced portion of the bushing. The bushing is up-set or spun outwardly at 27 to retain the bushing in the spring case. The lugs 26 serve as driving lugs, that is, they prevent rotation of the spring case in relation to the bushing. This enables the forming of the spring case of very light metal and at the same time it is connected to the staff so that the winding strain is distributed over a considerable portion of the spring case material.

The ratchet 19 coacts with a ratchet 28 on the gear 29, the gear being revolvably mounted on the staff and having limited axial movement thereon. The function of this ratchet connection will be hereinafter referred to. This gear 29 meshes with a pinion 30 on the stub shaft 31 carried by the gear plate, the stub shaft also carrying a gear 32 which in turn meshes with a pinion 33 referred to hereinafter as the spool pinion on the hub 34 which constitutes the hub of the spool. On this hub are rigidly mounted the friction driving disks 38 and 39, the disks being separated by the spacing sleeve 34', the disks and sleeve being secured to the pinion hub 34 to revolve therewith by heading over the end of the hub at 34''.

The line carrying portion of the spool comprises a pair of flanges 35 and a barrel 36, the flanges having annular shoulders or offsets 37 for centrally supporting the barrel, the barrel being in the form of a tube. The flanges 35 are provided with lugs 35' engaging notches 36' in the barrel 36 so that the flanges and barrel revolve as a unit on the spacing sleeve 34' when there is sufficient stress on the line to overcome the friction between the friction or tension disks 38 and 39, and the spool flanges 35. This permits the rotation of the spool under undue stress independently of the driving mechanism.

A spring 41 engages the gear 29 for yieldingly supporting the ratchet members in engagement. A ratchet wheel 42 is provided to keep the spring from unwinding except through rotation of the spool, the ratchet wheel being arranged on the staff below the spool. A detent 43 is pivoted at 44 to coact with the ratchet and is provided with a finger piece 45 projecting through a slot 46 in the base member of the casing, the finger piece being a means for disengaging the detent 43 from the ratchet, thus allowing the spring to unwind without revolving the spool. This feature is used when the angler wishes to reduce the tension on the spool without changing the line on his reel.

The spring 47 holds the ratchet normally in engaging position.

The brake lever 48 is a spring member, being forked at its inner end and secured at 49 to the casing so that its brake shoe 50 is yieldingly held against the spool flange. This brake lever is provided with an extension 51 projecting from the casing, used as a finger piece or control.

A latch 52 is pivotally mounted on the brake lever so that the latch can be engaged with the screw 12 thus holding the brake lever in disengaged position, thus allowing the driving or main spring 18 to have full control of the spool when playing a fish.

A releasing spring 53 is provided for the latch 52, the tension of this spring not being sufficient to release the latch when engaged with its keeper, but being sufficient to throw the latch to inoperative position when the finger piece 51 is pressed. The ratchet members 19 and 28 are not called into operation during the operation of the reel under normal conditions but are provided to avoid the likelihood of injury to the parts in case the brake is released, either intentionally or accidentally, when the spring is under heavy tension as would be the case when it is fully or substantially wound. In the event of releasing the brake in such a case the spring would unwind very rapidly and when completely unwound would tend to wind up in the other direction, which might result in disengaging its connections to the shaft or place it under severe stress. By providing the ratchet at this point the spring can unwind to its full extent and the ratchet will then act until the momentum of the spool has been checked.

I preferably provide line guide eyes 54. These line guide eyes are preferably in the form of agate rings which are seated in openings 55 provided therefor in the cross members 3 of the casing, the eyes being peripherally grooved so that the holes may be punched out of the casing and the metal distorted around the holes, the eyes inserted in position, and the edges of the holes compressed or spun into the groove.

By thus forming and arranging the parts, I provide a structure in which the parts may be made of comparatively light material which results in a structure which is compact and light in weight and at the same time it is strong and durable.

Having thus described my invention, what I claim as new and desire to secure by Letters Patent, is:

1. In a fishing reel, the combination of a cup-like casing provided with means for attachment to a fishing rod, a staff rotatably mounted on said casing, a holding ratchet means for said staff, a gear plate having a peripheral flange telescoping with said casing, means for supporting said gear plate against rotation, a spool rotatably mounted on said staff and provided with a pinion, a driving gear provided with a driven ratchet member mounted for rotative and axial movement on said staff, connecting gears for said driving gear and spool pinion mounted on said gear plate, a driving ratchet member mounted on said staff to coact with said driven ratchet member, a cup-like spring case inverted upon said gear plate and secured to said staff and having an outwardly projecting bearing flange, a bearing ring for said spring case provided with a flange telescoping with said gear plate and having a raised annular bead-like bearing portion coacting with said spring case bearing flange, a driving spring disposed within said spring case and having its outer end secured thereto and its inner end secured to said driving ratchet member, and a concavo-convex spring tension disc mounted on the end of said staff to engage said spring case.

2. In a fishing reel, the combination of a casing, a staff rotatably mounted on said casing, a holding ratchet means for said staff, a gear plate mounted on said casing, a spool rotatably mounted on said staff and provided with a pinion, a driving gear provided with a driven ratchet member mounted for rotative and axial movement on said staff, connecting gears for said driving gear and spool pinion mounted on said gear plate, a driving ratchet member mounted on said staff to coact with said driven ratchet member, a spring case inverted upon said gear plate and secured to said staff, a driving spring disposed within said spring case and having its outer end secured thereto and its inner end secured to said driving ratchet member, and a concavo-convex spring tension disc mounted on the end of said staff to engage said spring case.

3. In a fishing reel, the combination of a cup-like casing provided with means for attachment to a fishing rod, a staff rotatably mounted on said casing member, a holding ratchet means for said staff, a gear plate having a peripheral flange telescoping with said casing, means for supporting said gear plate against rotation, a spool rotatably mounted on said staff and provided with a pinion, a driving gear provided with a driven ratchet member mounted for rotative and axial movement on said staff, connecting gears for said driving gear and spool pinion mounted on said gear plate, a driving ratchet member mounted on said staff to coact with said driven ratchet member, a cup-like spring case inverted upon said gear plate and secured to said staff and having an outwardly projecting bearing flange, a bearing ring for said spring case provided with a flange telescoping with said gear plate and having a raised annular bead-like bearing portion coacting with said spring case bearing flange, and a driving spring disposed within said spring case and having its outer end secured thereto and its inner end secured to said driving ratchet member.

4. In a fishing reel, the combination of a casing, a staff rotatably mounted on said casing, a holding ratchet means for said staff, a gear plate mounted on said casing, a spool rotatably mounted on said staff and provided with a pinion, a driving gear provided with a driven ratchet member mounted for rotative and axial movement on said staff, connecting gears for said driving gear and spool pinion mounted on said gear plate, a driving ratchet member mounted on said staff to coact with said driven ratchet member, a spring case inverted upon said gear plate and secured to said staff, and a driving spring disposed within said spring case and having its outer end secured thereto and its inner end secured to said driving ratchet member.

5. In a fishing reel, the combination of a casing, a staff rotatably mounted on said casing, a holding ratchet means for said staff, a gear plate mounted on said casing, a spool rotatively mounted on said staff and provided with a pinion, a driving gear provided with a driven ratchet member mounted for rotative and axial movement on said staff, connecting gears for said driving gear and spool pinion mounted on said gear plate, a driving ratchet member mounted on said staff to coact with said driven ratchet member, a spring mounted on said gear plate to yieldingly hold said ratchet members in engagement, a spring case inverted upon said gear plate and secured to said staff, and a driving spring disposed within said spring case and having its outer end secured thereto and its inner end secured to said driving ratchet member.

6. In a fishing reel, the combination of a cup-like casing, a staff rotatably mounted on said casing, a holding ratchet means for said staff, a gear plate having a peripheral flange telescoping with said casing, means for supporting said gear plate against rotation, a spool rotatably mounted on said staff, a cup-like spring case inverted upon said gear plate and secured to said staff and having an outwardly projecting bearing flange, a bearing ring for said spring case provided with a flange telescoping with said gear plate and having a raised annular bead-like bearing portion coacting with said spring case bearing flange, a concavo-convex spring tension disc mounted on the end of said staff to engage said spring case, a driving spring disposed within said spring case and connected thereto for winding, and driving connections for said spring to said spool including a gear mounted on said gear plate.

7. In a fishing reel, the combination of a cup-like casing, a staff rotatably mounted on said casing, a holding ratchet means for said staff, a gear plate having a peripheral flange telescoping with said casing, means for supporting said gear plate against rotation, a spool rotatably mounted on said staff, a cup-like spring case inverted upon said gear plate and secured to said staff and having an outwardly projecting bearing flange, a bearing ring for said spring case provided with a flange telescoping with said gear plate and having a raised annular bead-like bearing portion coacting with said spring case bearing flange, a driving spring disposed within said spring case and connected thereto for winding, and driving connections for said spring to said spool including a gear mounted on said gear plate.

8. In a fishing reel, the combination of a casing, a staff rotatably mounted on said casing, a holding ratchet means for said staff, a gear plate mounted on said casing, a spool, rotatably mounted on said staff, a spring case inverted upon said gear plate and secured to said staff, a bearing ring for said spring case mounted on said gear plate, a concavo-convex spring tension disc mounted on the end of said staff to engage said spring case, a driving spring disposed within said spring case and connected thereto for winding, and driving connections for said spring to said spool.

9. In a fishing reel, the combination of a casing, a staff rotatably mounted on said casing, a holding ratchet means for said staff, a gear plate mounted on said casing, a spool rotatably mounted on said staff, a spring case inverted upon said gear plate and secured to said staff, a bearing ring for said spring case mounted on said gear plate, a driving spring disposed within said spring case and connected theerto for winding, and driving connections for said spring to said spool.

10. In a fishing reel, the combination of a casing, a staff rotatably mounted on said casing, a holding ratchet means for said staff, a gear plate mounted on said casing, a spool rotatably mounted on said staff, a spring case inverted upon said gear plate and secured to said staff, a concavo-convex spring tension disc mounted on the end of said staff to engage said spring case, a driving spring disposed within said spring case and connected thereto for winding, and driving connections for said spring to said spool.

11. In a fishing reel, the combination of a casing, a staff, a gear plate mounted on said casing, a spool, a spring case inverted upon said gear plate and secured to said staff, a bearing ring for said spring case provided with a flange embracing with said gear plate and having a raised annular bead-like bearing portion coacting with said spring case, a driving spring disposed within said spring case and connected thereto for winding, and driving connections for said spring to said spool.

12. In a fishing reel, the combination of a casing, a staff, a gear plate mounted on said casing, a spool, a spring case inverted upon said gear plate and secured to said staff, a bearing ring for said spring case mounted on said plate and having an annular bearing portion coacting with said spring case, a driving spring disposed within said spring case and connected thereto for winding, and driving connections for said spring to said spool.

13. In a fishing reel, the combination of a casing, a staff rotatably mounted on said casing, a ratchet means for said staff, a gear plate on said casing, a spool rotatably mounted on said staff and provided with a pinion, a driving gear provided with a driven ratchet member mounted for rotative and axial movement on said staff, connecting gears for said driving gear and spool pinion mounted on said gear plate, a driving ratchet member mounted on said staff to coact with said driven ratchet member, a spring mounted on said gear plate to yieldingly hold said ratchet members in engagement, a spring case inverted upon said gear plate and secured to said shaft, and a driving spring disposed within said spring case and having its outer end secured thereto and its inner end secured to said driving ratchet member.

14. In a fishing reel, the combination of a staff, a spool hub, a pair of friction driving discs mounted on said hub, a sleeve on said hub spacing said discs, a pair of spool flanges disposed between and coacting with said driving discs, said flanges being rotatable upon said sleeve, and having inwardly offset barrel supporting shoulders, a tubular barrel disposed on said shoulders, said barrel having notches at the ends thereof, and said flanges having lugs struck in therefrom to engage said notches whereby the flanges and barrel may be revolved on said sleeve between said friction driving discs as a unit, a driving spring, and driving connections for said spring to said spool hub.

15. In a fishing reel, the combination of a staff, a spool hub, a pair of friction driving discs mounted on said hub, a sleeve on said hub spacing said discs, a pair of spool flanges disposed between and coacting with said driving discs, said flanges being rotatable upon said sleeve, a tubular barrel disposed between said flanges, said flanges being secured to said barrel so that the flanges and barrel may be revolved as a unit between said friction driving discs when subjected to excessive stress, a driving spring, and driving connections for said spring to said spool hub.

16. In a structure of the class described, the combination of a casing, a staff, a spool hub rotatable upon said staff, spool driving discs on said hub, there being a spacing sleeve between said discs, and a spool comprising flanges rotatable upon said spacing sleeve and having frictional engagement with said driving discs.

17. In a structure of the class described, the combination of a hub having a pinion at one end, a pair of friction discs, a spacing sleeve therefor arranged on said hub, said hub being upset at the end opposite said pinion to secure said friction discs and spacing sleeve to the hub, and a spool comprising flanges rotatable upon said sleeve and in driving engagement with said friction discs.

18. In a structure of the class described, the combination of a hub provided with spaced friction driving discs; a spool comprising a pair of flanges having inwardly offset portions in coacting driving engagement with said friction discs, and a barrel disposed to engage said inwardly offset portions and having notches in its ends, said flanges having lugs struck in therefrom to engage said notches.

19. In a structure of the class described, the combination of a hub provided with spaced friction driving discs, a spool comprising a pair of flanges in coacting driving engagement with said friction discs, and a barrel disposed between and having notches in its ends, said flanges having lugs struck in therefrom to engage said notches.

20. In a structure of the class described, the combination with a staff having a non-circular portion, a spring case having an opening therein with a plurality of spaced notches, the outer edge of said opening being beveled, a reinforcing bushing disc of greater thickness than the said case shouldered to fit within said opening therein, the outer edge of said disc being upset to overlap said beveled edge of said case, said bushing disc having lugs struck out from the underlying portion thereof engaging said notches, said bushing disc having a central opening therein engaging said staff, a winding spring disposed within and operatively associated with said case, a concavo-convex spring disc and a screw tapped into said staff for securing said disc in position.

21. In a structure of the class described, the combination with a spring case having an opening therein with a plurality of spaced notches, the outer edge of said opening being beveled, a reinforcing bushing disc of greater thickness than the said case shouldered to fit within said opening therein, the outer edge of said disc being upset to overlap said beveled edge of said case, said bushing disc having lugs struck out from the underlying portion thereof engaging said notches, and a winding spring disposed within and operatively associated with said case.

22. In a structure of the class described, the combination with a staff having a non-circular portion, a spring case having an opening therein with a plurality of spaced notches, a reinforcing bushing of greater thickness than the said case shouldered to fit within said opening therein, the said disc being upset upon the edge of said case to secure the parts together, said bushing having lugs struck out from the underlying portion thereof engaging said notches, said bushing having a central opening therein engaging said staff, a winding spring disposed within and operatively associated with said case, a concavo-convex spring disc and a screw tapped into said staff for securing said disc in position.

23. In a structure of the class described, the combination with a spring case having an opening therein with a plurality of spaced notches, a reinforcing bushing of greater thickness than the said case shouldered to fit within said opening therein, the said disc being upset upon the edge of said case to secure the parts together, said bushing having lugs struck out from the underlying portion thereof engaging said notches, and a winding spring disposed within and operatively associated with said case.

24. The combination of a sheet metal part having an opening therein with a plurality of spaced notches, the outer edge of said opening being beveled, and a reinforcing bushing disc of greater thickness than the said sheet metal part shouldered to fit within said opening therein, the outer edge of said disc being upset to overlap said beveled edge, said bushing disc having lugs struck from the underlying portion thereof engaging said notches.

25. The combination of a sheet metal part having an opening therein with a plurality of spaced notches, and a reinforcing bushing disc of greater thickness than the said sheet metal part shouldered to engage within said opening therein, the outer edge of said disc being upset upon said sheet metal part, said bushing disc having lugs struck from the underlying portion thereof engaging said notches.

26. The combination of a sheet metal part having an opening therein with a plurality of spaced notches, and a reinforcing bushing disc of greater thickness than the said sheet metal part shouldered to engage within said opening therein, said bushing disc having lugs struck up from the underlying portion thereof engaging said notches.

27. In a structure of the class described, the combination with a casing, a staff mounted thereon, a spool, a driving spring, driving connections for said spring to said spool including a ratchet, a spring case connected to said spring for winding the same, said spring case being mounted on said staff, a concavo-convex spring disc superimposed on said spring case to engage the same under spring tension, and a screw tapped into said staff for securing said spring disc thereto.

28. In a structure of the class described, the combination with a casing, a staff mounted thereon, a spool, a driving spring, driving connections for said spring to said spool including a ratchet, a spring case connected to said spring for winding the same, and a concavo-convex spring disc superimposed on said spring case and secured to said staff to engage said case under spring tension.

In witness whereof, I have hereunto set my hand and seal.

SAMUEL G. RUSSELL. [L. S.]